Patented July 24, 1934

1,967,370

UNITED STATES PATENT OFFICE 1,967,370

WATER INSOLUBLE AZODYESTUFF DERIVED FROM 2.3-HYDROXYNAPHTHOIC ACID ARYLIDES

Eugen Rimele and Eugen Glietenberg, Leverkusen-on-the-Rhine, Germany, assignors to General Aniline Works, Inc., New York, N. Y., a corporation of Delaware No Drawing. Application July 7, 1928, Serial No. 291,137. In Germany August 2, 1927

8 Claims. (Cl. 260—89)

The present invention relates to the new azodyestuffs of the following general formula:

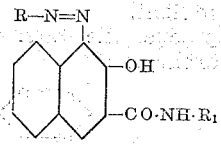

wherein R represents a naphthalene nucleus, which is substituted by at least one alkoxy group and by a further substituent selected from the group consisting of halogen, the nitro group and an alkoxy group, and $R_1$ represents a benzene or naphthalene nucleus which may be substituted.

The new dyestuffs are obtainable by coupling a diazotized amino-naphtholether, which is substituted by at least one further substituent selected from the group consisting of halogen, the nitro group and an alkoxy group with a 2.3-hydroxynaphthoic acid arylide. They yield upon reduction with a strong reducing agent e. g. hydrochloric acid and zinc a substituted amino-naphthol ether and an arylamide of 1-amino-2.3-hydroxy-naphthoic acid.

The following examples will illustrate our invention, without limiting it thereto:

The new dyestuffs may be produced on the fibre or in substance or on a suitable substratum. They form reddish-blue to reddish-violet powders, which are insoluble in water but dissolve in concentrated sulfuric acid with a strong coloration. They yield on the fibre red to reddish-blue to reddish-violet shades having a good fastness to light.

*Example 1.*—218 parts by weight (1 mol.) of 4-nitro-7-methoxy-1-amino-naphthalene are ground with 500 parts by weight of concentrated hydrochloric acid and a small quantity of water and diazotized with 69 parts by weight of nitrite with brisk stirring and cooling on ice. The solution is then diluted with water and neutralized with sodium bicarbonate (or sodium acetate) and the material previously impregnated with a solution containing 6 grams per litre of 2.3-hydroxynaphthoic acid α-naphthalide is steeped in the diazo solution for a short time. After rinsing the dyed materials they are soaped at the boiling point. A reddish violet shade is obtained of very satisfactory fastness to chlorine and boiling and excellent fastness to light.

The dyestuff has probably the following formula:

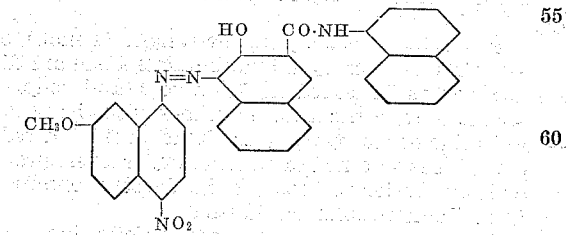

It represents a reddish-violet powder, which dissolves in concentrated sulfuric acid with a green-blue coloration and yields upon reduction with zinc and hydrochloric acid 1.4-diamino-7-methoxy-naphthalene and 1-amino-2.3-hydroxynaphthoic acid alpha-naphthylamide.

The 4-nitro-7-methoxy-1-aminonaphthalene is obtainable by nitration of methoxyacetylaminonaphthalene and subsequent saponification. It crystallizes from hot alcohol in beautiful orange red rhombs melting at 210° C. The acetyl compound crystallizes from the same solvent in long lemon yellow needles melting at 227° C.

Similar shades with in some cases even better fastness to light are obtainable by replacing the 2.3-hydroxynaphthoic acid-α-naphthalide in the above example by 2.3-hydroxynaphthoic acid para anisidide,
2.3-hydroxynaphthoic acid para phenetidide,
2.3-hydroxynaphthoic acid meta anisidide, more bluish shades by replacing the same by
2.3-hydroxynaphthoic acid anilide which gives a dyestuff of the formula:

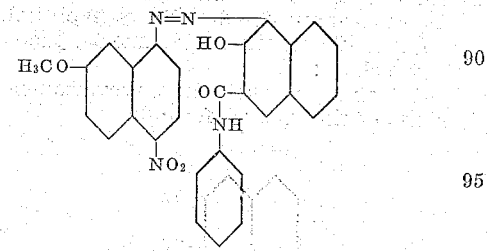

2.3-hydroxynaphthoic acid-β-naphthalide,
2.3-hydroxynaphthoic acid ortho toluidide.

*Example 2.*—232 parts by weight (1 mol.) of 4-nitro-2-ethoxy-1-amino-naphthalene are diazotized and the diazo-solution thus obtained is diluted and neutralized as described in Example 1. The materials previously impregnated with 2.3-hydroxynaphthoic acid-α-naphthalide are steeped in the diazo solution for a short time, rinsed and soaped. A reddish blue shade is thus obtained having similar fastness properties as the shade obtainable according to Example 1.

The dyestuff has the following formula:

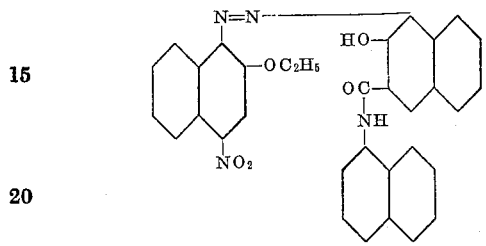

The 4-nitro-2-ethoxy-1-naphthylamine is obtainable, for example, by nitration of the formyl compound of 2-ethoxy-1-naphthylamine (the nitro compound crystallizes from hot alcohol in lemon yellow felted needles, melting at 211° C.) and subsequent saponification. It crystallizes from alcohol in deep red coarse prisms melting at 152° C.

*Example 3.*—205.5 parts by weight (1 mol.) of 1-amino-2-methoxy-4-chloronaphthalene are diazotized as described in Example 1 and coupled on the fibre in the known manner with the para-anisidide of 2.3-hydroxy-naphthoic acid. A reddish blue is obtained of satisfactory fastness properties, superior to those of the dyestuff obtained from the non-chlorinated base.

The dyestuff has probably the following formula:

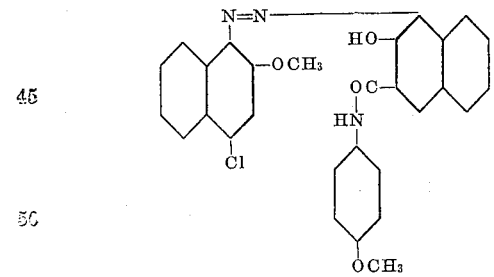

The 4-chloro-1-amino-2-methoxy-naphthalene is obtainable by chlorination of 1-acetamino-2-methoxy-naphthalene in glacial acetic acid. The acetyl product which separates is saponified, for example with 15% hydrochloric acid, and yields long needles of the hydrochloride which after recrystallization from alcohol melt at 225° C.

*Example 4.*—Similar reddish violet shades to those described in Example 1 are obtained by using 1-amino-2.7-dimethoxy-naphthalene (see Journal für praktische Chemie 94, page 34).

We claim:

1. As new products the water insoluble azodyestuffs of the general formula:

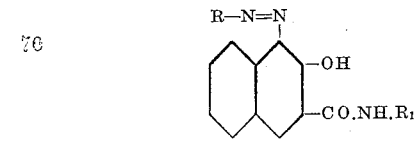

wherein R represents a naphthalene nucleus, which is substituted by at least one alkoxy group and by a further substituent selected from the group consisting of halogen, the nitro group and an alkoxy group, and $R_1$ stands for a residue of the benzene or naphthalene series, the said products being in the dry state red to reddish-violet powders, yielding when produced on the fibre red to reddish-violet shades having a good fastness to light.

2. As new products the water insoluble azo-dyestuffs of the general formula:

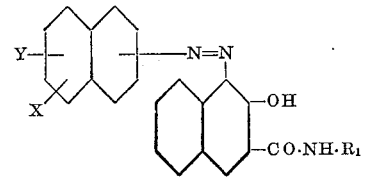

wherein X represents a substituent of the group consisting of nitro, alkoxy and halogen, and Y represents a substituent of the group consisting of methoxy and ethoxy and $R_1$ stands for a residue of the benzene or naphthalene series, the said products being in the dry state red to reddish-violet powders, yielding when produced on the fibre red to reddish-violet shades having a good fastness to light.

3. As a new product the water insoluble azo-dyestuff of the formula:

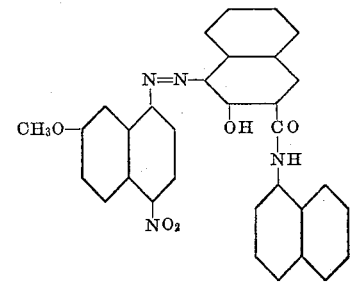

yielding when produced on the fibre a reddish-violet shade of very satisfactory fastness to chlorine and boiling and of excellent fastness to light, and forming a reddish-violet powder which dissolves in concentrated sulfuric acid with a green-blue coloration.

4. As a new product the water insoluble azo-dyestuff of the formula:

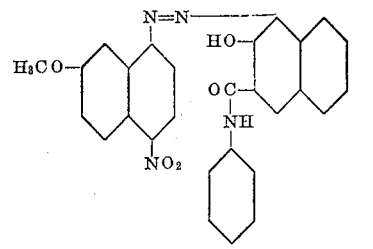

yielding when produced on the fibre bluish-red shades of very satisfactory fastness to chlorine and boiling and of excellent fastness to light.

5. Fibres dyed with the dyestuffs described in claim 1.

6. Fibres dyed with the dyestuffs described in claim 2.

7. Fibres dyed with the dyestuff described in claim 3.

8. Fibres dyed with the dyestuff described in claim 4.

EUGEN RIMELE. [L. S.]
EUGEN GLIETENBERG. [L. S.]